(12) United States Patent  (10) Patent No.: US 9,126,723 B2
Messerschmidt  (45) Date of Patent: Sep. 8, 2015

(54) GAME CAMERA SECURITY BOX

(71) Applicant: Ronald Messerschmidt, Oak Ridge, NJ (US)

(72) Inventor: Ronald Messerschmidt, Oak Ridge, NJ (US)

( * ) Notice: Subject to any disclaimer, the term of this patent is extended or adjusted under 35 U.S.C. 154(b) by 0 days.

(21) Appl. No.: 13/889,459

(22) Filed: May 8, 2013

(65) Prior Publication Data

US 2014/0291327 A1 Oct. 2, 2014

Related U.S. Application Data

(60) Provisional application No. 61/805,972, filed on Mar. 28, 2013.

(51) Int. Cl.
*G03B 17/00* (2006.01)
*B65D 25/22* (2006.01)
*G02B 23/16* (2006.01)

(52) U.S. Cl.
CPC .............. *B65D 25/22* (2013.01); *G02B 23/16* (2013.01); *G03B 17/00* (2013.01)

(58) Field of Classification Search
CPC ................ G08B 13/19632; G08B 13/19619
USPC ........................................ 396/429; 348/151
See application file for complete search history.

(56) References Cited

U.S. PATENT DOCUMENTS

| 1,408,900 | A | | 3/1922 | Miller et al. |
| 3,575,450 | A | * | 4/1971 | Lang ................................ 292/1 |
| 4,934,649 | A | * | 6/1990 | Stout et al. .................... 248/551 |
| 5,669,592 | A | | 9/1997 | Kearful |
| 6,449,431 | B1 | | 9/2002 | Cuddeback et al. |
| 6,698,942 | B2 | | 3/2004 | Ward |
| 6,728,480 | B1 | | 4/2004 | Maeda et al. |
| 7,345,707 | B1 | * | 3/2008 | McClain ....................... 348/373 |
| 7,832,696 | B2 | | 11/2010 | Goodman |
| 7,835,634 | B2 | | 11/2010 | Berend et al. |
| D652,287 | S | | 1/2012 | Woller |
| D653,276 | S | | 1/2012 | Schnell |

(Continued)

FOREIGN PATENT DOCUMENTS

EP  2150055 A2  2/2010

OTHER PUBLICATIONS

Moultrie Camera System found at http://www.walmart.com/ip/Moultrie-Game-Spy-1-65S/14972135#Item+Description.

(Continued)

*Primary Examiner* — Clayton E Laballe
*Assistant Examiner* — Noam Reisner
(74) *Attorney, Agent, or Firm* — DeLio, Peterson & Curcio, LLC; Peter W. Peterson

(57) ABSTRACT

A security box system for securely housing a game camera includes a mount portion having a rear surface conforming to curvature of and secured to a tree with at least one aperture for a fastener passing therethrough, and a sleeve extending from the mount portion rear surface toward the tree. The sleeve surrounds the fastener aperture and is rotatable when contacted by a cutting implement. The cover portion has an opening for the camera to permit the photographing of game. The cover portion is securable to the mount portion to house the camera therebetween. An internal pin on the cover portion is positionable within a pin aperture on the mount portion to secure the cover portion to the mount portion and prevent removal therefrom. The pin and pin aperture are inaccessible from outside the security box system.

13 Claims, 4 Drawing Sheets

(56) References Cited

U.S. PATENT DOCUMENTS

| | | |
|---|---|---|
| 8,251,598 B2 | 8/2012 | Lee et al. |
| 2002/0140850 A1 | 10/2002 | Toste et al. |
| 2002/0159770 A1 | 10/2002 | Moultrie, Jr. |
| 2005/0212912 A1 | 9/2005 | Huster |
| 2009/0010637 A1 | 1/2009 | DeWitt |
| 2009/0194443 A1* | 8/2009 | Cuddeback ................ 206/316.2 |
| 2009/0201412 A1 | 8/2009 | Ament, Jr. |
| 2010/0208068 A1* | 8/2010 | Elsemore ..................... 348/143 |

OTHER PUBLICATIONS

Stealth Camera System found at http://www.stealthcam.net.

* cited by examiner

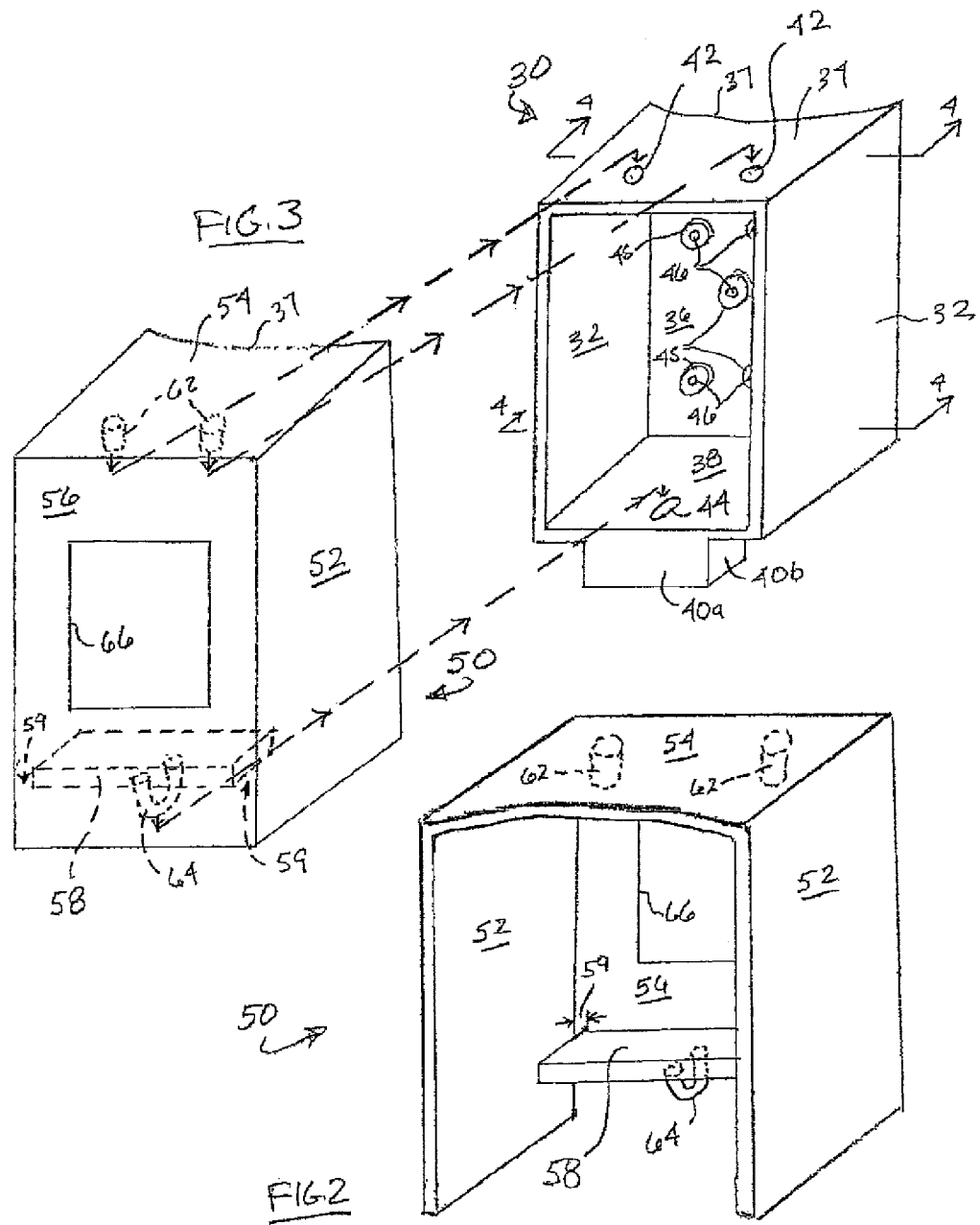

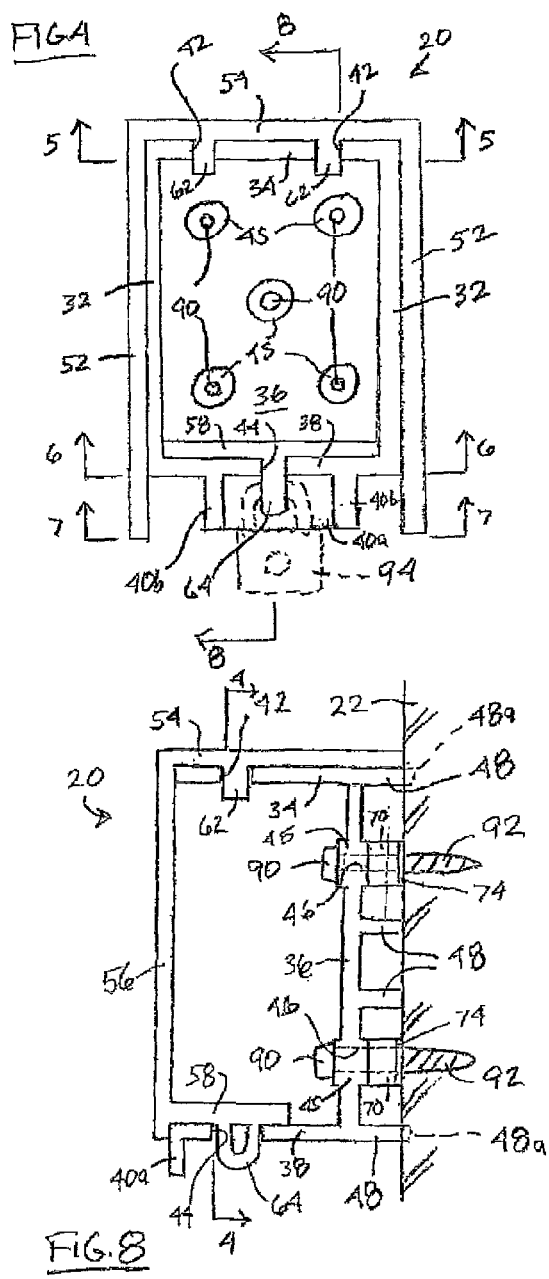
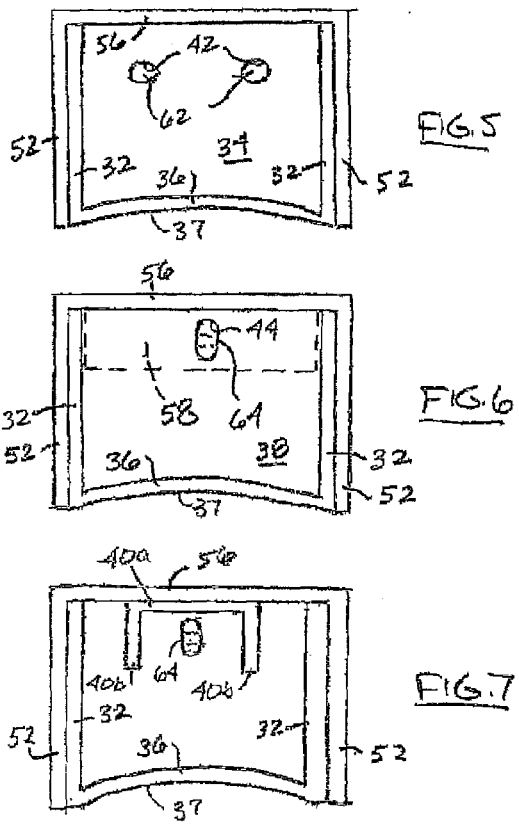

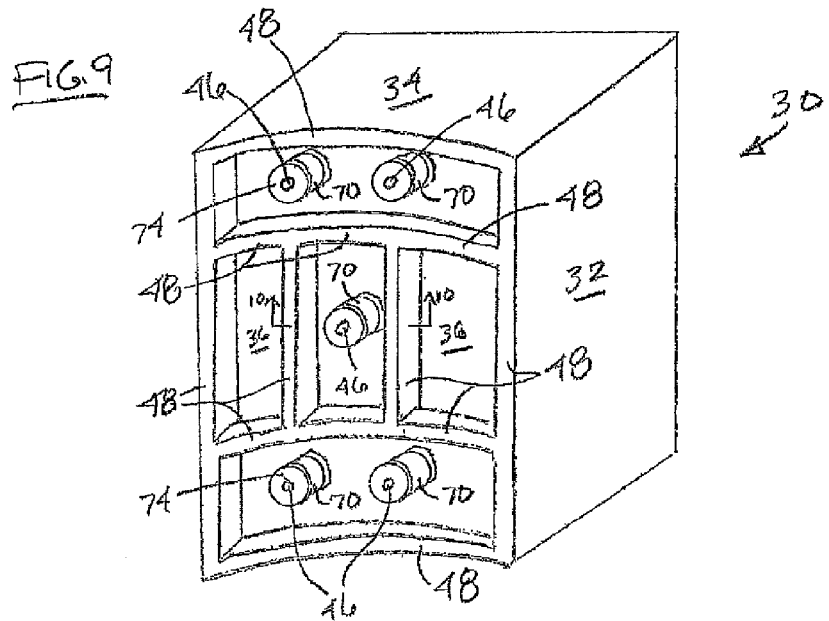
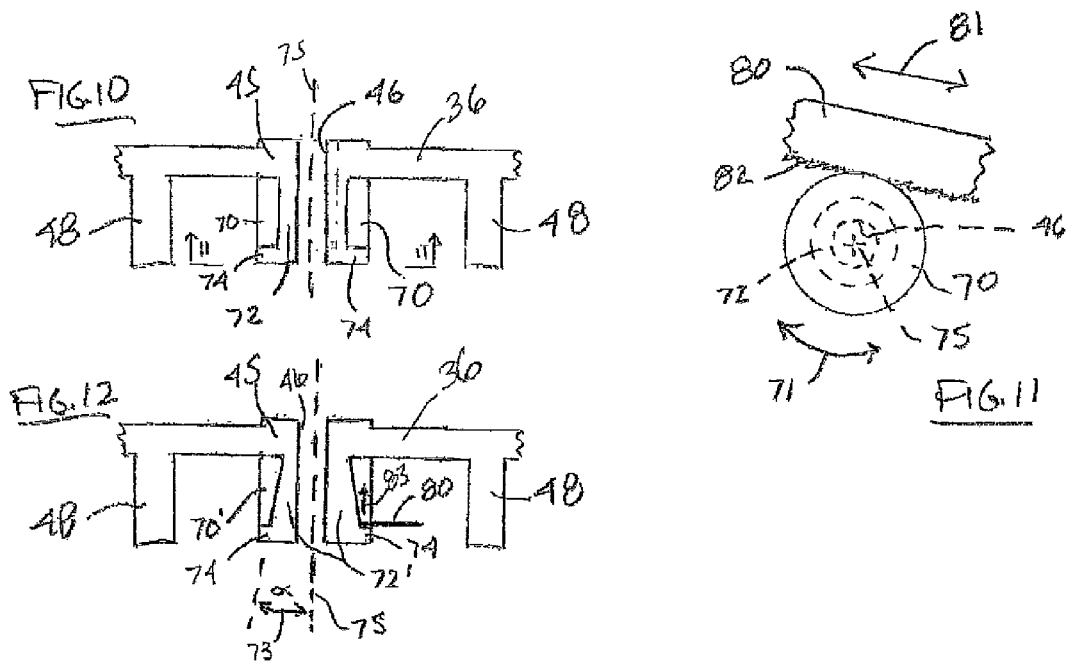

GAME CAMERA SECURITY BOX

BACKGROUND OF THE INVENTION

1. Field of the Invention

The present invention relates to an apparatus and method for securing a camera used to photograph game in the wild.

2. Description of Related Art

Hunters and others often use cameras, either still or video, to photograph game in the wild. Boxes are typically secured to trees or other structures to hold the camera. Unfortunately, thieves and vandals are known to open or damage such boxes to steal or destroy the game cameras.

SUMMARY OF THE INVENTION

Bearing in mind the problems and deficiencies of the prior art, it is therefore an object of the present invention to provide an improved security box system and method of using such security box to protect a game or other camera.

It is another object of the present invention to provide a security box system that is more resistant to vandalism and theft.

A further object of the invention is to provide a security box system that minimizes the exposure of the fasteners securing the components of such box system to each other and to the tree or other structure.

It is yet another object of the present invention to provide a security box system that reduces the ability of cutting tools to cut through the fasteners securing such box system.

Still other objects and advantages of the invention will in part be obvious and will in part be apparent from the specification.

The above and other objects, which will be apparent to those skilled in the art, are achieved in the present invention which is directed to a security box system for securely housing a game camera on a tree or other structure comprising a mount portion having a rear surface for securing to the tree or other structure with at least one aperture for a fastener passing therethrough and a sleeve extending from the mount portion rear surface toward the tree or other structure. The sleeve surrounds the fastener aperture and is rotatable with respect to an axis of the fastener when contacted by a cutting implement. The system further includes a cover portion having an opening for the camera to permit the photographing of game, the cover portion being securable to the mount portion to house the camera therebetween.

The system mount portion may include a shroud extending from the rear surface toward the tree and substantially around the sleeve to restrict access by a cutting implement when the mount portion is secured to the tree. The mount portion may have a non-planar rear surface for conforming to the curvature of the tree.

In another aspect the present invention is directed to a security box system for securely housing a game camera on a tree or other structure comprising a mount portion having a rear surface for securing to the tree or other structure with at least one aperture for a fastener passing therethrough and a cover portion having an opening for the camera to permit the photographing of game. The cover portion is securable to the mount portion to house the camera therebetween. The system also includes one of a pin or pin aperture on the mount portion and the other of the pin or pin aperture on the cover portion. The pin is positionable within the pin aperture to secure the cover portion to the mount portion and prevent removal therefrom. The pin and pin aperture are inaccessible from outside the security box system.

The mount portion may include one of a loop or loop aperture and the cover portion may include the other of the loop or loop aperture. The loop is extendible though the loop aperture to receive a padlock to secure the cover portion to the mount portion and prevent removal therefrom. The mount portion or cover portion may include a shroud around the loop to restrict access by a cutting implement when the cover portion is secured to the mount portion.

In a further aspect the present invention is directed to a method for securely housing a game camera on a tree or other structure comprising providing a security box having a mount portion with a rear mounting surface with at least one aperture for a fastener passing therethrough, and a cover portion having an opening for the camera to permit the photographing of game. The cover portion is securable to the mount portion to house the camera therebetween. The security box includes one of a pin or pin aperture on the mount portion and the other of the pin or pin aperture on the cover portion. The pin is positionable within the pin aperture to secure the cover portion to the mount portion and prevent removal therefrom. The pin and pin aperture being inaccessible from outside the security box system. The method then includes securing the mount portion by passing a fastener through the at least one fastener aperture and into the tree or other structure. The method further includes placing the game camera between the mount portion and the cover portion, placing the cover portion over the mount portion by positioning the pin within the pin aperture, and securing the cover portion to the mount portion with a lock to prevent the pin from being removed from the pin aperture. No fastener securing the box to the tree or other structure and no pin or pin aperture securing the cover portion to the mount portion is visible from the exterior of the security box.

The method may further include providing a sleeve extending from the mount portion rear surface toward the tree or other structure. The sleeve surrounds the fastener aperture and is rotatable with respect to an axis of the fastener when contacted by a cutting implement. The method may also include providing a shroud extending from the rear surface of the mount portion toward the tree and substantially around the sleeve to restrict access by a cutting implement when the mount portion is secured to the tree.

The method may additionally include providing a shroud extending from a periphery of the rear surface of the mount portion toward the tree and substantially around the at least one fastener to restrict access by a cutting implement when the mount portion is secured to the tree. The method then includes digging the shroud into a surface of the tree or structure to restrict access to the at least one fastener by a cutting implement.

The method may also include providing one of a loop or loop aperture on the mount portion and the other of the loop or loop aperture on the cover portion, and extending the loop though the loop aperture to receive a padlock to secure the cover portion to the mount portion. The method may then include providing a shroud on the mount portion or cover portion around the loop to restrict access by a cutting implement when the cover portion is secured to the mount portion. The method may also include providing a non-planar rear surface on the mount portion for conforming to curvature of the tree or other structure.

The invention also provides a security box system for securely housing a game camera that protects against damage and theft of the camera in the field, comprising a mount portion having a top surface, sidewalls, a back surface, at least one radial rib portion, a camera housing opening and at least one mount fixation member. The mount fixation member includes an aperture therein that extends from the top surface through the back surface of the mount portion, traversing through the mount fixation members, wherein the apertures are provided for receiving a spike, lag bolt or other securing members. The radial portion is located on the back surface of the mount portion in a manner so that the radial rib portion is generally substantially flush with or less than in height than the side walls of mount portion. A lockbox cover portion securely fastens over and on top of the mount portion to substantially cover and encase the mount portion. The mount portion may be appointed to rest flush or substantially flush against a tree's side as the radial rib portions rest snuggly and securely against the tree's side via securing members, wherein the securing members are fully enclosed and are not viewable from an exterior.

Other embodiments are also contemplated concerning the construction of each of the mount portion and lockbox cover portion. Preferably, there are at least four mount fixation members located near side walls, and at least one mount fixation member is located centrally to the mount portion. Preferably each mount fixation member includes an aperture therein that extends from the top surface through back surface, traversing through the mount fixation members, wherein the apertures are appointed to receive a spike, lag bolt or securing members. In one embodiment, radial rib portions are located on the back surface of mount portion in a manner so that the radial rib portions heights are generally substantially flush with or less than in height than the side walls of a mount portion; and, in another embodiment, lockbox cover portion is preferably constructed having a base portion that corresponds to the shape of the mount portion so that base portion snaps slides over mount portion.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2 is a perspective view of the rear of the cover portion of the security box of FIG. 1.

FIG. 3 is an exploded front perspective view of the assembly of the cover and mount portions of the security box of FIG. 1

FIG. 4 is an elevational view the rear of the security box along lines 4-4 of FIGS. 1 and 8.

FIG. 5 is a plan view of the underside of the top of the security box along lines 5-5 of FIG. 4, FIG. 6 is a plan view of the underside of the bottom of the security box along lines 6-6 of FIG. 4.

FIG. 7 is a plan view of the underside of the bottom of the security box along lines 7-7 of FIG. 4.

FIG. 8 is a side cross-sectional view of the security box attached to a tree trunk along lines 8-8 of FIG. 4.

FIG. 9 is a perspective of the rear of the mount portion of the security box of FIG. 1.

FIG. 10 is a cross-sectional view of the fastener rotatable sleeve and shroud portions of the mount portion along lines 10-10 of FIG. 9.

FIG. 11 is an end view of the fastener rotatable sleeve along lines 11-11 of FIG. 10.

FIG. 12 is an alternate embodiment of the fastener rotatable sleeve of FIG. 9.

DESCRIPTION OF THE PREFERRED EMBODIMENT(S)

Figure 1:
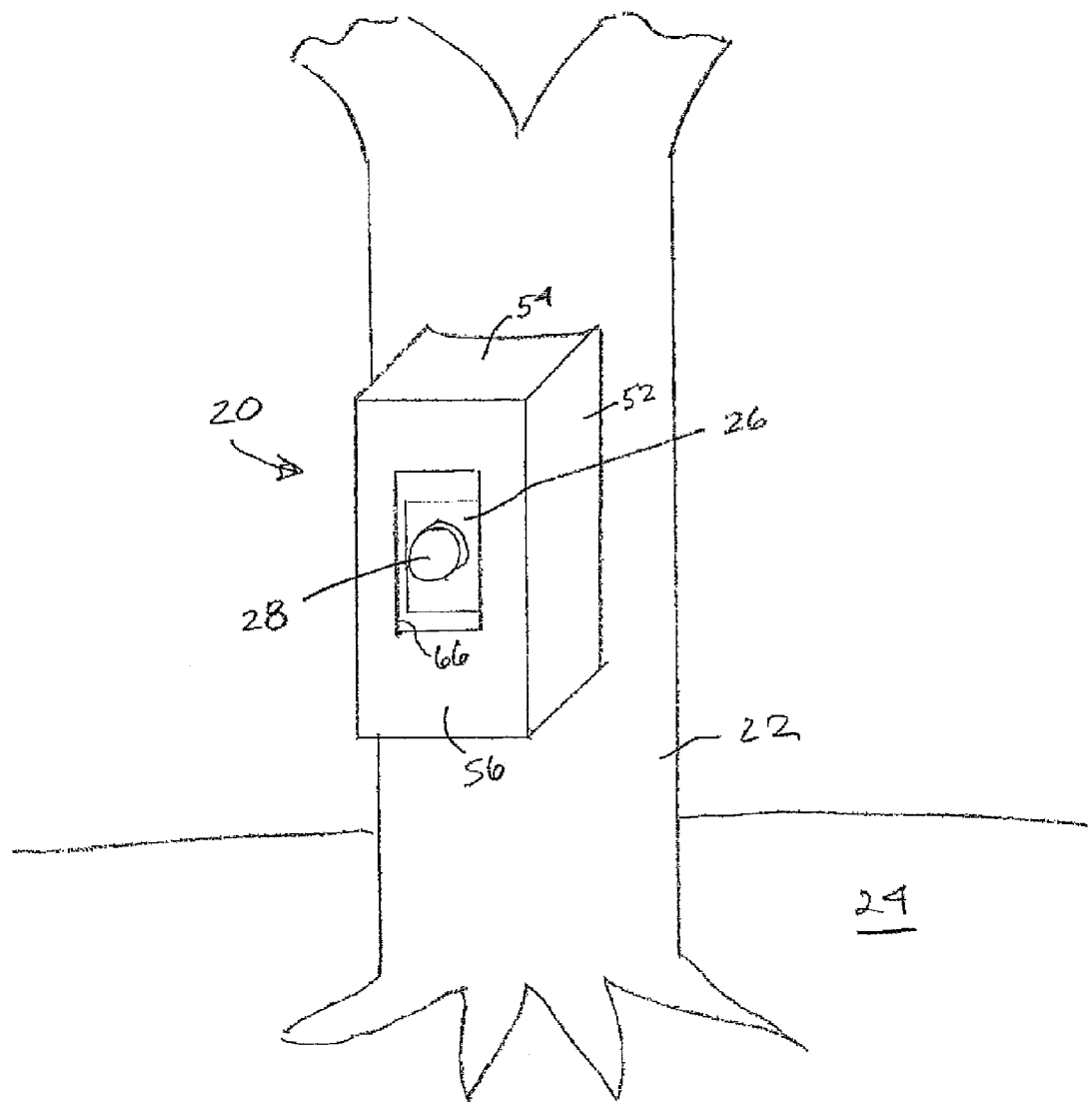
FIG. 1 is a perspective view of an embodiment of the game camera security box of the present invention mounted on a tree.

The present invention is directed to a security box system for securely housing a game camera that protects against theft of the camera in the field. The game camera security box may be comprised of a mount portion or first shroud and a lockbox cover portion or second shroud. The mount portion includes a top surface, sidewalls, a back surface and radial rib portions. Further included within mount portion are mount fixation members. Preferably, at least four mount fixation members are located near sidewalls and at least one mount fixation member is located centrally to the mount portion. Mount fixation members each include an aperture therein that extends from the surface through back surface, traversing through the mount fixation members. Apertures are appointed to receive fastener or securing members. Radial rib portions are located on the back surface of mount portion in a manner so that the radial rib portions heights are generally substantially flush with or less than in height than the side walls of mount portion. In this manner, mount portion rests flush or substantially flush against a tree's side as radial rib portions rests snuggly and securely against the tree's side via securing members. Further, owing to this construction, securing members are fully enclosed and are not viewable from the exterior. Access to the securing members cannot be accomplished from the exterior of the box. Thus thieves or animals cannot otherwise cut or damage the securing members. Protection accorded to the box and camera is substantial, since cutting or damage to the securing members would likely create an undesirable result in that the box and camera housed therein could be removed from the tree and/or its location or otherwise damaged. The mount portion or first shroud includes a camera housing opening that is appointed to receive and hold camera. The mount portion or first shroud is covered by and is received within lockbox cover portion or second shroud. The lockbox cover portion securely snaps over or slides over and on top of mount portion to substantially cover and encase mount portion. The lockbox cover portion preferably is constructed having a base portion that corresponds to the shape of the mount portion so that base portion snaps over or slides over mount portion.

In describing an embodiment of the present invention, reference will be made herein to FIGS. 1-12 of the drawings in which like numerals refer to like features of the invention.

As shown in FIG. 1, the security box 20 may be mounted to the trunk of a tree 22 at any desired height above the ground 24. Typically, the security box is mounted at a height within easy reach of the user, e.g., approximately 3-4 feet above the ground level, so that the camera 26 may take photographs at ground level of game such as deer, pheasants and other wildlife. The security box encloses camera 26 and has an opening 66 for the camera lens 28. This opening 66 may be optionally covered with a clear cover such as glass, lexan or plexiglas, but is typically left open for best photographing of the game. The opening 66 should be smaller than the size of the camera 26 to prevent the camera from being removed therethrough.

The security box 20 has a mount portion 30 and a cover portion 50, as shown in FIG. 3. Mount portion 30 may be securely affixed to the tree trunk 22 by fasteners placed through openings 46 in the rear wall 36 of the mount. Side walls 32 on either side of rear wall 36 extend outward from the tree and connect to top 34 and floor 38 of the mount portion. The side, top and floor portions are shown as being planar, but may be of any desired shape. Rear wall 36 may be planar or other desired shape as well. As shown, rear wall 36 has straight side edges and a curvature 37 therebetween that conforms generally to the exterior curvature of the tree trunk to which it is to be affixed. Mount fixation members 45 are disposed along rear walls 36, with each having an aperture 46 for a threaded or other fastener to secure the mount portion to the tree trunk 22. Such fasteners 90 (FIG. 8) may include threaded end portions 92 to be screwed into the tree trunk, for example, lag bolts. Alternatively, fasteners 90 may be nailed or otherwise secured to the tree. While reference is made herein to directions of the box components, e.g., top, side and bottom, such references are made with reference to the embodiment shown. The security box of the present invention may be oriented in any other direction with respect to a tree or other structure.

Box cover portion 50 has top 54, sidewalls 52 and front surface 56 which again are shown as being generally planar. These cover top and side walls may be of other shape, and may be sized to snugly and slidingly fit over the exterior of the respective top and side walls of the mount portion 30. The rear edge of cover top 54 may have a curvature 37 conforming to that of the rear wall 36 of mount 30 and the supporting tree. Within the cover portion 50, there is a shelf 58 that extends rearwardly from the inner surface of front panel 56. Shelf 58 extends horizontally across the inside of the front wall 56 but does not contact the sidewalls 52 as shown. A gap 59 (FIG. 2) is provided at each end of the shelf to receive mount portion sidewalls 32 between the shelf ends and the inner surfaces of the cover side walls when the cover is placed over the mount.

To secure the cover portion to the mount portion, there are provided one or more internal pins 62 shown as extending downwardly from the lower surface of cover top 54 and locking loop 64 extending downwardly from the lower surface of shelf 58. Two pins 62 are shown although more or fewer pins may be utilized as desired. Likewise more than one locking loop may be provided. Mount portion 30 has pin apertures 42 which are located corresponding to the location of cover pin 62 when the cover is placed over the mount. Pin apertures extend downwardly from the upper surface of and through the thickness of top 34. Similarly, the inner surface of mount floor 38 has a slot opening 44 located at a position corresponding to the location of locking loop 64 when the cover is placed over the mount. Loop slot 44 is sized to receive locking loop 64 and the locking loop is sized to extend through the slot below the lower surface of mount floor 38 to permit a key-operated or combination padlock to pass through.

As indicated in FIG. 3, cover 52 may be slid over the exterior of mount 30 slightly above mount 30 and then lowered so that pins 62 and locking loop 64 are received in pin apertures 42 and locking loop aperture 44, respectively. Once the pins and locking loop are received in their respective openings in the mount, the cover 50 cannot be pulled away horizontally from the mount and away from the tree. To secure and lock cover 50 in place on the mount, a padlock 94 (FIG. 4) is placed below the mount 30 and through the locking loop 64 extending downward through opening 44 in the mount floor. This lock then prevents upward movement of the cover with respect to the mount, so that the cover pins 62 cannot be moved upward and out of the pin apertures 42, thereby preventing removal of the cover portion 50.

In the embodiment shown, pins 62 extend downward from the interior of cover 50 and are not visible from the exterior of cover top 54. Except for the padlock visible below, a potential vandal or thief would therefore not be aware of the internal locking structure of the security box 20.

Although pins 62 are shown on the cover and pin apertures 42 are shown on the mount, these may be reversed so that the pins are on the mount and the pin apertures are on the cover. When on the cover, the pin apertures may be made so they do not extend completely through top 54 to avoid revealing the location of the pins from the box exterior. Any combination of pin and aperture location may be used, for example one on the cover and one on the mount. Likewise, the loop and loop aperture may be reversed on their respective cover and mount portions.

To prevent cutting and removal of padlock 94, shroud walls 40a and 40b are provided extending from the lower surface of mount floor 38. Shroud 40a extends downward from the front of the mount portion and laterally along the front of locking loop 64 and padlock 94. Shroud walls 40b extend back on the either side of the locking loop and padlock. Together, the shroud walls leave only a limited open portion below and restrict easy access to the locking loop and the padlock. If desired a further shroud wall may be placed behind the side shrouds 40b for further security.

Mount 30 and cover 50 may be made of any desired material to prevent cutting or other vandalism, such as steel or other alloy or any other material that provides the desired strength and vandal resistance. Preferably mount 30 and cover 50 are one-piece, unitary structures, i.e. cast, molded or welded so that the portions thereof are not easily removed.

Protection against cutting of fasteners 90 that secure the security box to the tree or other structure is provided by shroud walls 48 extending radially from the curved rear wall 36 of mount portion 30. These shroud walls may surround individual ones or pairs of the fastener apertures 46 (FIG. 9). In the embodiment shown, four mount fixation members and corresponding apertures 46 are provided, with each of the four at approximately a corner of the mount and one at the approximate center of the mount. More or fewer fixation members and fastener apertures may be provided as desired.

Extending from the rear of each of mount fixation members 45, as shown in FIG. 10, is a shaft 72 having an annular configuration surrounding fastener opening 46 and a radially outwardly extending flange 74 at the end thereof. Sleeve 70 is rotatably disposed over shaft 72 and secured between the rear surface of mount rear wall 36 and flange 74. Rotatable sleeve 70 is provided to limit the ability of a cutting implement such as a saw or grinder to cut through any fasteners securing the mount to the tree. As shown in FIG. 11, if a saw 80 is slipped behind the mount 30, saw teeth 82 will tend to bite into sleeve 70. As the saw is reciprocated in directions 81, the teeth will cause sleeve 72 to rotate alternately in rotational directions 71. The spinning of sleeve 70 will then restrict the ability of the saw to cut therethrough. To further restrict the ability of the saw to cut through the fastener as shown in FIG. 12, shaft 72' may have a truncated conical outer surface at acute angle $\alpha$ with respect to the axis of fastener opening 46. The inner surface of sleeve 70 is likewise conformed to this angle $\alpha$. If a saw 80 is able to cut through sleeve 70', the angle of the inner shaft 72' will tend to force the saw in a sideways direction as indicated by arrow 83.

The shroud portions around the exterior periphery of mount 30 may be made so that they extend further rearward from rear wall 36 than the sleeves and flanges extending from mount fixation members 45. This enables the peripheral shroud walls 48 to dig into the bark of the tree somewhat to restrict access by cutting implements, such as saws that would be used to cut the fasteners 90. In addition to protection from a cutting implement such as a saw or grinder, the structure of the shrouds also makes it more difficult to remove or open the box with a hammer or pry bar. Except for the padlock, no fasteners either securing the box components to each other or securing the box to the tree are visible or easily accessible.

Accordingly, the present invention provides an improved security box system and method of using such security box to protect a game or other camera. The security box system is more resistant to vandalism and theft by minimizing the exposure of the fasteners securing the components of such box system to each other and to the tree or other structure, and/or reducing the ability of cutting tools to cut through the fasteners securing such box system.

The subject game camera security box protects against theft of game cameras in the field. Owing to the dual shroud construction utilized, the subject game camera security box structure is very difficult to defeat and offers considerable improvement over extent game camera protection devices heretofore disclosed and utilized. Features of the invention include one or more of the following: 1) a radius to the back of the box to conform to the tree to protect the attachment bolts; 2) increased the strength of the box so that it is more difficult to remove the box with a hammer or crow bar; 3) exterior and interior shrouds, so that the back of the box extends to the tree to prevent saws and grinders from removing or cutting the attachment bolts; 4) a five bolt pattern to attach the camera to the tree, four of which are protected by the first shroud on the outside edge of the box, and the fifth which is protected by an interior shroud in the center of the box that is harder to reach; 5) a rotating sleeve or spinner that spins if a saw or grinder tries to cut through it, to protect the attachment bolts; 6) locking pins on the interior of the cover that pass through the mount of the box to prevent the cover from being ripped off or removed; 7) a locking loop on the cover which passes through the mount and is recessed within a lock shroud to protect it from saws, bolt cutters or grinders. The box has no exposed fasteners or locking mechanisms, all of which are either internal or protected by shrouds.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A security box system for securely housing a game camera on a tree or other structure comprising:
   a mount portion having a rear surface for securing to the tree or other structure with at least one aperture for a fastener passing therethrough and a top extending from the rear surface;
   a cover portion having an opening for the camera to permit the photographing of game and a top, the cover portion being securable to the mount portion, with the mount portion top adjacent the cover portion top, to house the camera therebetween; and
   one of a pin or pin aperture on the mount portion top and the other of the pin or pin aperture on the cover portion top, the pin being vertically positionable within the pin aperture to secure the cover portion to the mount portion and prevent removal therefrom, the pin and pin aperture being inaccessible from outside the security box system.

2. The system of claim 1 wherein the mount portion includes one of a loop or loop aperture and the cover portion includes the other of the loop or loop aperture, the loop being extendible though the loop aperture to receive a padlock to secure the cover portion to the mount portion and prevent removal therefrom.

3. The system of claim 1 wherein the mount portion includes one of a loop or loop aperture and the cover portion includes the other of the loop or loop aperture, the loop being extendible though the loop aperture to receive a padlock to secure the cover portion to the mount portion and prevent removal therefrom, the mount portion or cover portion including a shroud around the loop to restrict access by a cutting implement when the cover portion is secured to the mount portion.

4. The system of claim 1 further including a sleeve extending from the mount portion rear surface toward the tree, the sleeve surrounding the fastener aperture and being rotatable with respect to an axis of the fastener when contacted by a cutting implement.

5. The system of claim 1 wherein the mount portion includes a shroud extending from the rear surface toward the tree and substantially around the sleeve to restrict access by a cutting implement when the mount portion is secured to the tree.

6. A security box system for securely housing a game camera on a tree or other structure comprising:
   a mount portion having a non-planar rear surface for conforming to curvature of and securing to the tree or other structure with at least one aperture for a fastener passing therethrough and a top extending from the rear surface;
   a sleeve extending from the mount portion rear surface toward the tree or other structure, the sleeve surrounding the fastener aperture and being rotatable with respect to an axis of the fastener when contacted by a cutting implement;
   a cover portion having an opening for the camera to permit the photographing of game and a top, the cover portion being securable to the mount portion, with the mount portion top adjacent the cover portion top, to house the camera therebetween; and
   one of a pin or pin aperture on the mount portion top and the other of the pin or pin aperture on the cover portion top, the pin being vertically positionable within the pin aperture to secure the cover portion to the mount portion and prevent removal therefrom, the pin and pin aperture being inaccessible from outside the security box system.

7. A method for securely housing a game camera on a tree or other structure comprising:
   providing a security box having a mount portion with a rear mounting surface with at least one aperture for a fastener passing therethrough and a top extending from the rear surface, a cover portion having an opening for the camera to permit the photographing of game and a top, the cover portion being securable to the mount portion to house the camera therebetween, and one of a pin or pin aperture on the mount portion top and the other of the pin or pin aperture on the cover portion top, the pin being vertically positionable within the pin aperture to secure the cover portion to the mount portion and prevent removal therefrom, the pin and pin aperture being inaccessible from outside the security box system;
   securing the mount portion by passing a fastener through the at least one fastener aperture and into the tree or other structure;
   placing the game camera between the mount portion and the cover portion;
   placing the cover portion over the mount portion, with the mount portion top adjacent the cover portion top, and lowering the cover portion top down over the mount portion top to position the pin within the pin aperture;

securing the cover portion to the mount portion with a lock to prevent the pin from being removed from the pin aperture, whereby no fastener securing the box to the tree or other structure and no pin or pin aperture securing the cover portion to the mount portion is visible from the exterior of the security box.

8. The method of claim 7 further including providing a sleeve extending from the mount portion rear surface toward the tree or other structure, the sleeve surrounding the fastener aperture and being rotatable with respect to an axis of the fastener when contacted by a cutting implement.

9. The method of claim 8 further including providing a shroud extending from the rear surface of the mount portion toward the tree and substantially around the sleeve to restrict access by a cutting implement when the mount portion is secured to the tree.

10. The method of claim 7 further including providing a shroud extending from a periphery of the rear surface of the mount portion toward the tree and substantially around the at least one fastener to restrict access by a cutting implement when the mount portion is secured to the tree, and including digging the shroud into a surface of the tree or structure to restrict access to the at least one fastener by a cutting implement.

11. The method of claim 7 further including providing one of a loop or loop aperture on the mount portion and the other of the loop or loop aperture on the cover portion, and including extending the loop though the loop aperture to receive a padlock to secure the cover portion to the mount portion.

12. The method of claim 11 further including providing a shroud on the mount portion or cover portion around the loop to restrict access by a cutting implement when the cover portion is secured to the mount portion.

13. The method of claim 7 further including providing a non-planar rear surface on the mount portion for conforming to curvature of the tree or other structure.

* * * * *